United States Patent
Hernandez (10) Patent No.: US 8,636,164 B2
(45) Date of Patent: Jan. 28, 2014

(54) CONTROLLING THE RATED BURST PRESSURE OF A RUPTURE DISC THROUGH THE USE OF CONTROL SCORES ON THE DISC DOME

(75) Inventor: Gabriel Hernandez, Kansas City, MO (US)

(73) Assignee: Continental Disc Corporation, Liberty, MO (US)

( * ) Notice: Subject to any disclaimer, the term of this patent is extended or adjusted under 35 U.S.C. 154(b) by 1136 days.

(21) Appl. No.: 12/331,611

(22) Filed: Dec. 10, 2008

(65) Prior Publication Data
US 2010/0140264 A1 Jun. 10, 2010

(51) Int. Cl.
B65D 90/36 (2006.01)
B65D 51/16 (2006.01)
F16K 17/14 (2006.01)
F16K 17/40 (2006.01)

(52) U.S. Cl.
USPC ............... 220/89.2; 220/203.08; 137/68.19; 137/68.26

(58) Field of Classification Search
USPC ............ 220/89.2, 203.08; 137/68.19, 68.26
See application file for complete search history.

(56) References Cited

U.S. PATENT DOCUMENTS

| | | | |
|---|---|---|---|
| 3,484,817 A | 12/1969 | Wood | |
| 3,831,822 A | 8/1974 | Zundel | |
| 3,834,580 A | 9/1974 | Ludwig et al. | |
| 3,881,629 A | 5/1975 | Shaw et al. | |
| 3,921,556 A | 11/1975 | Wood et al. | |
| 4,003,505 A | 1/1977 | Hardt | |
| 4,434,905 A | 3/1984 | Ou et al. | |
| 4,441,350 A | 4/1984 | Short, III et al. | |
| 4,458,516 A | 7/1984 | Naumann | |
| 4,481,850 A | 11/1984 | Allen | |
| 4,512,171 A * | 4/1985 | Mozley | 72/55 |
| 4,588,101 A | 5/1986 | Ruegg | |
| 4,819,823 A | 4/1989 | Kadakia et al. | |
| 4,838,447 A | 6/1989 | Albracht et al. | |
| 4,905,722 A | 3/1990 | Rooker et al. | |
| 5,002,085 A | 3/1991 | FitzGerald | |
| 5,082,133 A | 1/1992 | Farwell et al. | |
| 5,167,337 A | 12/1992 | Short, III et al. | |
| 5,368,180 A | 11/1994 | Farwell et al. | |
| 5,482,075 A | 1/1996 | Farwell et al. | |
| 5,499,649 A | 3/1996 | Tomasko et al. | |
| 5,558,114 A | 9/1996 | Strelow | |
| 5,570,803 A | 11/1996 | Farwell | |
| 5,678,307 A | 10/1997 | Farwell | |
| 5,996,605 A | 12/1999 | Farwell | |

(Continued)

FOREIGN PATENT DOCUMENTS

WO 2008155783 A1 12/2008

Primary Examiner — Anthony Stashick
Assistant Examiner — Andrew T Kirsch
(74) Attorney, Agent, or Firm — Husch Blackwell LLP (57) ABSTRACT

A rupture disc for use in a pressure relief system includes a dome having a concave and a convex side and a circumferential flange associated therewith. At least one control score is formed or otherwise produced in the dome at a radial position between an apex of the dome and an outer circumference of the dome. At least one of a depth, a width, a length and the radial portion of the at least one control score is selectively controlled so that the depth, width, length, and/or radial position of the at least one control score controls the pressure at which the dome will start to collapse.

40 Claims, 8 Drawing Sheets

(56) References Cited

U.S. PATENT DOCUMENTS

| | | | |
|---|---|---|---|
| 6,006,938 A * | 12/1999 | Mozley et al. | 220/89.2 |
| 6,065,485 A | 5/2000 | Rooker | |
| 6,178,983 B1 * | 1/2001 | Culliinane et al. | 137/68.26 |
| 6,192,914 B1 | 2/2001 | Farwell | |
| 6,241,113 B1 | 6/2001 | Mozley et al. | |
| 6,321,582 B1 | 11/2001 | Cullinane et al. | |
| 6,672,389 B1 * | 1/2004 | Hinrichs | 166/317 |
| 6,792,964 B2 * | 9/2004 | Farwell et al. | 137/68.25 |
| 6,945,420 B2 * | 9/2005 | Krebill et al. | 220/89.2 |
| 7,234,481 B2 | 6/2007 | Henderson et al. | |
| 2005/0206145 A1 * | 9/2005 | Kato et al. | 280/737 |
| 2006/0237457 A1 | 10/2006 | Shaw et al. | |

* cited by examiner

| # scores | depth score | radial location | Buckling Load |
|---|---|---|---|
| - | inch | inch | psi |
| none | - | - | 419 |
| 3 | 0.003 | 0.20 | 410 |
| | | 0.30 | 391 |
| | | 0.40 | 404 |
| | | 0.50 | 415 |
| | 0.005 | 0.20 | 376 |
| | | 0.30 | 329 |
| | | 0.40 | 359 |
| | | 0.50 | 373 |
| | 0.007 | 0.20 | 301 |
| | | 0.30 | 232 |
| | | 0.40 | 261 |
| | | 0.50 | 274 |
| 5 | 0.003 | 0.20 | 404 |
| | | 0.30 | 376 |
| | | 0.40 | 394 |
| | | 0.50 | 409 |
| | 0.005 | 0.20 | 352 |
| | | 0.30 | 299 |
| | | 0.40 | 331 |
| | | 0.50 | 344 |
| | 0.007 | 0.20 | 285 |
| | | 0.30 | 212 |
| | | 0.40 | 240 |
| | | 0.50 | 254 |
| 7 | 0.003 | 0.20 | 397 |
| | | 0.30 | 363 |
| | | 0.40 | 385 |
| | | 0.50 | 402 |
| | 0.005 | 0.20 | 335 |
| | | 0.30 | 279 |
| | | 0.40 | 312 |
| | | 0.50 | 325 |
| | 0.007 | 0.20 | 274 |
| | | 0.30 | 202 |
| | | 0.40 | 231 |
| | | 0.50 | 244 |

FIG. 8C

CONTROLLING THE RATED BURST PRESSURE OF A RUPTURE DISC THROUGH THE USE OF CONTROL SCORES ON THE DISC DOME

BACKGROUND OF THE INVENTION

The present invention relates generally to a rupture disc and a method of manufacturing the same and, more particularly, to a rupture disc having control scores associated with the concave or convex side of the disc to facilitate controlling the reversal pressure at which the dome of the disc will start to collapse.

Systems and vessels that contain a pressurized fluid often include rupture discs that relieve the system in the event of over pressurization. The discs are generally placed in a vent or pressure vessel to prevent flow of the fluid through the vent until the disc ruptures. Specifically, as a system becomes over pressurized and reaches a predetermined pressure, the disc ruptures to allow flow of the fluid through the venting system, thereby relieving the pressure within the system.

Rupture discs are commonly formed as a forward acting tension type disc or a reverse-acting rupture disc. Forward acting tension type discs may include a score line in the surface of the disc to ensure that the disc opens at a predetermined pressure and pattern of opening. Reverse-acting rupture discs may be formed in a dome shape with a rated reversal load or pressure under which the pressure of the system causes the disc dome to buckle or collapse and rupture. Accordingly, reverse-acting rupture discs require a selective adjustment of the rated reversal load or pressure to satisfy individual rupture values specified by customers.

Many methods have been used in the prior art to control the rated reversal load or reversal pressure. For example, protrusions or indentations can be formed on the convex side of the disc dome at various heights, lengths, and locations to vary the reversal load of the disc dome. These protrusions and indentations result in a non-smooth process surface which has been perceived as not desirable for a system that is to be kept in a sterile condition. In other references such as U.S. Pat. Nos. 6,241,113 and 6,006,938, issued to Mozley et al., an indentation or deformation is deliberately formed in the dome of the disc to initiate reversal at the deformation. The height of the deformation is selected to control the reversal pressure of the dome.

U.S. Patent Application Publication 2006/0237457 describes a method of forming an indentation in the dome, wherein the indentation includes a predetermined extent and depth. The indentation is then removed by returning the metal of the indentation to its initial position thereby restoring a smooth surface. As a result of the removal of the indentation, the local region subject to such indentation has mechanical and material characteristics different from the rest of the disc material so that, by controlling the formation and removal of the indentation, this process controls the reversal load of the disc. However, such disc formation requires multiple steps with an associated additional variation in forming and returning the indentation to its original smooth condition.

Accordingly, there is a need for a mechanism and method to control the reversal pressure of a rupture disc that includes minimal steps and that is subject to less variation while maintaining the sanitary conditions necessary for many rupture disc applications.

SUMMARY OF THE INVENTION

The present invention provides a rupture disc with control scores and a manufacturing method for forming and/or producing the control scores to control the reversal pressure of the disc. In one embodiment, the method includes forming control score lines in the concave side of the disc's dome by removing material from the dome, or by thinning the material of the dome, and/or by other means. The length, width, depth, number, and radial location of the control score lines are selectively adjusted and determined to satisfy the rated reversal load of the customer's needs. The material removed from the concave side of the dome effectively weakens the dome, thus reducing the reversal or buckling pressure of the dome. The amount of change of the reversal pressure will depend upon various parameters such as the radial location of the lines of weakness, the number of lines of weakness, and the length, width and depth of the lines of weakness. Since the lines of weakness or control scores are position and located on the concave side of the dome, the convex side of the dome maintains a smooth surface on the process side without scores, indentations, dimples or other protrusions. A smooth process face is desirable for certain applications such as when rupture discs are used for sanitary applications. In one embodiment, the control score lines are formed or otherwise produced concentrically around approximately 300 degrees of the dome's circumference. In other embodiments, the control score lines can have a length, width, depth and/or location that is suitable for providing the required reversal load. Moreover, the dome may include any number of control score lines at any radial position between the apex and the outer diameter of the dome for controlling the required reversal pressure. In certain applications, the control scores may be formed on the convex side of the dome.

The control scores are configured to control the reverse buckling of the dome. The rupture disc may also include a rupture score which is typically provided at an outer circumference of the dome. The rupture score is separate and apart from the control scores. As the pressure in the system increases, the dome collapses until a rupture occurs at the rupture score. During rupture, the dome becomes partially separated from an annular flange surrounding the dome thereby allowing the fluid to pass into the associated venting system. The rupture score is configured to only extend partially around the dome so that a portion of the dome remains attached or coupled to the annular flange via a hinge after rupture. Accordingly, the dome does not break away into the system. The overall design of the at least one control score is controlled so as to guarantee that the disc will not open or fragment upon reversal at the control score(s) but only at the intended location for rupture, namely, at the rupture score or other rupture mechanism.

In another embodiment, the present invention includes a reverse-acting rupture disc having a dome and a flange coupled to an outer circumference of the dome and extending circumferentially around the dome. The dome includes a concave and a convex side. At least one non-linear or non-concentric control score is formed or otherwise produced in the concave side of the dome. The at least one control score is positioned between an apex of the dome and an outer circumference of the dome, and at least one of a depth, a width, and a length of the at least one control score is controlled so that the depth, width, length, and position of the control score controls the pressure at which the dome will collapse. The disc also includes a rupture score formed adjacent the outer diameter of the dome so that the disc ruptures at the rupture score when the disc is subject to a predetermined pressure.

A wide variety of patterns and shapes for the control scores or lines of weakness are also disclosed and are acceptable for a wide variety of different commercial applications.

Further areas of applicability of the present invention will become apparent from the detailed description provided hereinafter. It should be understood that the detailed description and specific examples, while indicating at least one embodiment of the present invention, are intended for purposes of illustration only and are not intended to limit the scope of the present invention.

BRIEF DESCRIPTION OF THE DRAWINGS

The present invention will become more fully understood from the detailed description and the accompanying drawings.

DETAILED DESCRIPTION

The following description of several embodiment(s) of the present invention are merely exemplary in nature and are in no way intended to limit the present invention, its application, or uses.

Figure 1A:
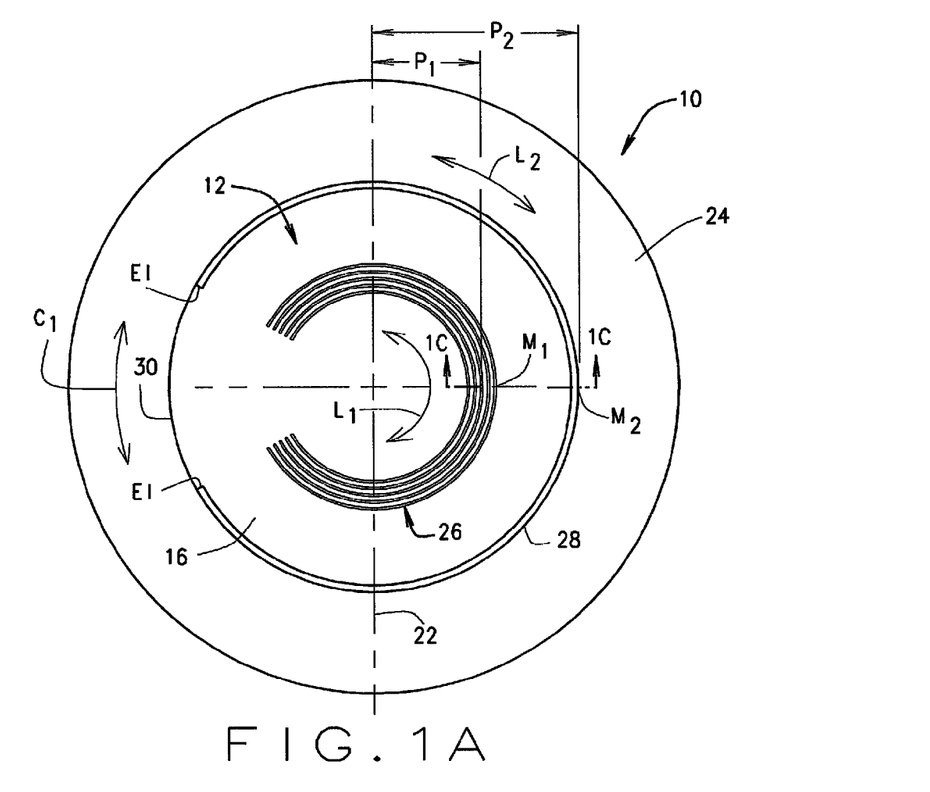
FIG. 1(a) is a view from the concave side of an exemplary reverse-acting rupture disc constructed in accordance with the teachings of the present invention.
Figure 1B:
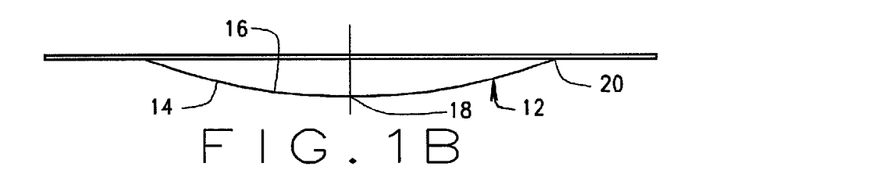
FIG. 1(b) is a side elevational view of the rupture disc shown in FIG. 1(a).
Figure 1C:
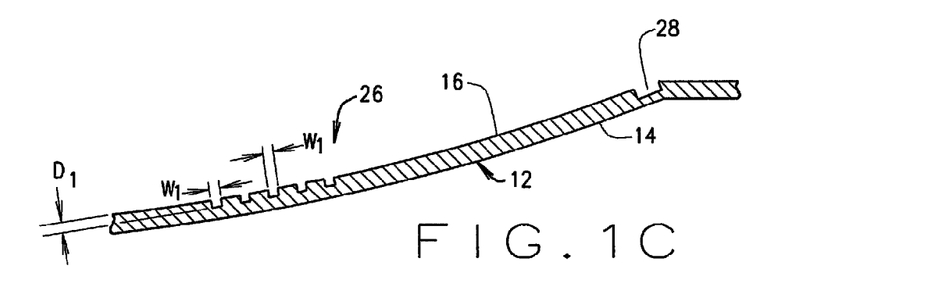
FIG. 1(c) is a cross-sectional view of the control scores located on the concave side of the rupture disc shown in FIGS. 1(a) and 1(b) taken along line 1C-1C in FIG. 1(a).

FIG. 1 illustrates one embodiment of an exemplary reverse-acting rupture disc 10 constructed in accordance with the teachings of the present invention. The disc 10 includes a concentric dome 12 having a convex side 14 and a concave side 16. The dome 12 also includes an apex 18 and an outer circumference 20. A radial position on the dome 12 is measured from an axis 22 extending through the apex 18 of the dome 12 to the outer circumference 20 of the dome 12. An annular flange 24 extends outwardly from the outer circumference 20 of the dome 12 and circumferentially around the dome 12. The flange 24 is disposed to couple the disc 10 within a pressure relief system through which a fluid flows, wherein the system is subject to varying pressures. In the exemplary embodiment, the thickness and the dome geometry of the disc 10 are selectively adjusted depending upon the intended application of the disc 10. In particular, different systems are subjected to different pressures and are capable of operating within different pressure ranges. Accordingly, the disc 10 is manufactured to a geometry and thickness that are suitable for the pressure range of the system in which the disc 10 will be applied.

The disc 10 is formed or otherwise produced with at least one control score 26 and a rupture score 28. The control score 26 removes material or otherwise thins the material from a predetermined location of the dome thus weakening the dome 12 to control a pressure at which the dome 12 will begin to collapse, whereas the rupture score 28 provides a preferred location at which the disc 10 ruptures. When the pressure relief system reaches a predetermined reversal load, the control score(s) 26 enable the dome 12 of the disc 10 to collapse inward. Immediately after the collapse, the disc 10 ruptures at the rupture score 28, not at the control score(s) 26, thereby relieving the pressure within the system. As discussed below, the depth D1, length L1, width W1, and radial position P1 of the control score(s) 26 are controlled during manufacturing to provide a rated reversal load for the disc 10 so as to achieve a predetermined rupture pressure.

In one embodiment, the at least one control score 26 is formed or otherwise produced in the concave side 16 of the dome 12 by removing and/or thinning material from the dome 12. Forming the at least one control score 26 on the concave side 16 of the dome 12 preserves a smooth face on the convex side 14 of the dome 12. Accordingly, the disc 10 is without grooves and/or indentations or other markings on the dome's convex side 14 so that the disc 10 can be used in applications where sanitary conditions within the system is of concern. In the exemplary embodiment, as will be appreciated by one of ordinary skill in the art, the at least one control score 26 can be formed or otherwise produced using any suitable known method including machining, etching, removing material, thinning material, and other methods.

The at least one control score 26 is radially positioned on the dome 12 between an apex 18 of the dome 12 and an outer circumference 20 of the dome 12 at a radial position P1 (FIGS. 1(a) and 1(b). The at least one control score 26 does not cut entirely through the thickness of the dome 12, but rather only cuts through a portion of the thickness of the dome 12 as best illustrated in FIG. 1(c). Further, a width W1, a depth D1, and a length L1 of the at least one control score 26 can be varied and each parameter is selectively adjustable based upon the intended application of the disc 10. Specifically, the width W1, depth D1, length L1, and radial position P1 of the at least one control score 26 is controlled during manufacturing so that the at least one control score 26 controls the pressure at which the dome 12 will start to collapse when subjected to that pressure within the system. Moreover, in the exemplary embodiment, the at least one control score 26 has an arcuate length L1 of approximately 300 degrees of the circumference C1 of the dome 12. By only scoring a portion of the dome's circumference C1, a loss of disc material and fragmentation of the disc 10 at the at least one control score 26 can be avoided during collapse of the dome 12 prior to rupture of the disc 10.

In the exemplary embodiment shown in FIG. 1, a plurality of control scores 26 are formed or otherwise produced in the concave side 16 of the dome 12. Each of the plurality of control scores 26 is positioned at a different radial position P1 between the apex 18 of the dome 12 and the outer circumference 20 of the dome 12. As shown in FIG. 1, each of the control scores 26 has an arcuate length L1 of approximately 300 degrees of the circumference C1 of the dome 12 and a midpoint M1 of each control score 26 is aligned along an arc A1 of the dome 12. By only scoring a portion of the dome's circumference C1 at each control score location and by aligning the plurality of control scores 26, a loss of disc material and fragmentation of the disc 10 at the plurality of control scores 26 can be avoided during collapse of the dome 12 prior to rupture of the disc 10. This is achieved by controlling the depth D1 of each control score or line of weakness 26.

Figure 2A:
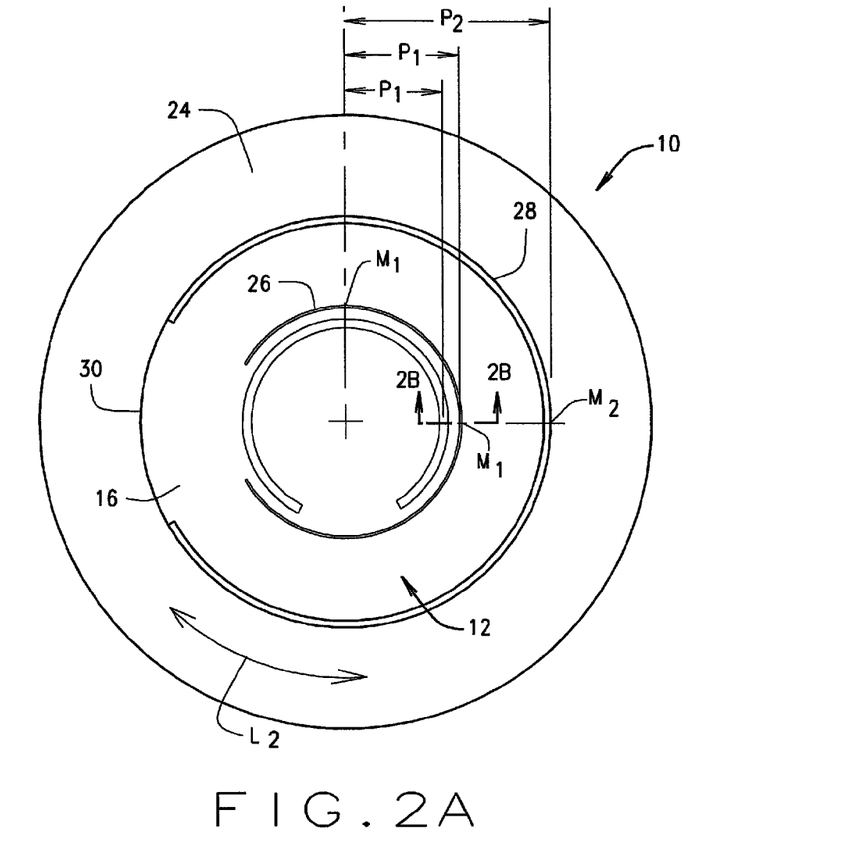
FIG. 2(a) is a view from the concave side of another embodiment of an exemplary reverse-acting rupture disc constructed in accordance with the teachings of the present invention.
Figure 2B:
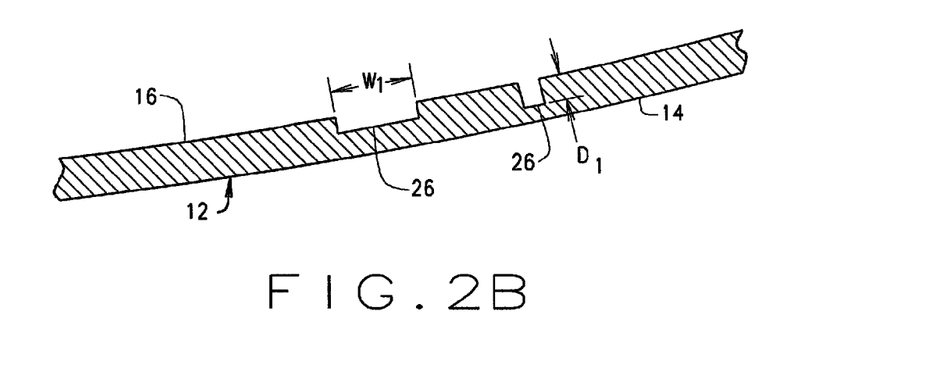
FIG. 2(b) is a cross-sectional view of the control scores located on the concave side of the rupture disc shown in FIG. 2(a) taken along line 2B-2B in FIG. 2(a).

In an alternative embodiment, as shown in FIG. 2, at least one of the plurality of control scores 26 has a different length L1 and/or is staggered so that the midpoint M1 of at least one control score 26 is not aligned with the midpoint M1 of other control scores 26. Also, as shown in FIG. 2, at least one of the plurality of control scores 26 has a different depth D1 and/or a different width W1 than the other control scores 26.

As a result, it is recognized and anticipated that any number of control scores can be used to achieve a predetermined reversal pressure and that any number of the control scores may have a different L1, W1 and D1 compared to each other or compared to groups of the control scores. All variations are possible including using a shape different from the annular or arc shaped control scores 26 illustrated in FIGS. 1 and 2.

Figure 7:
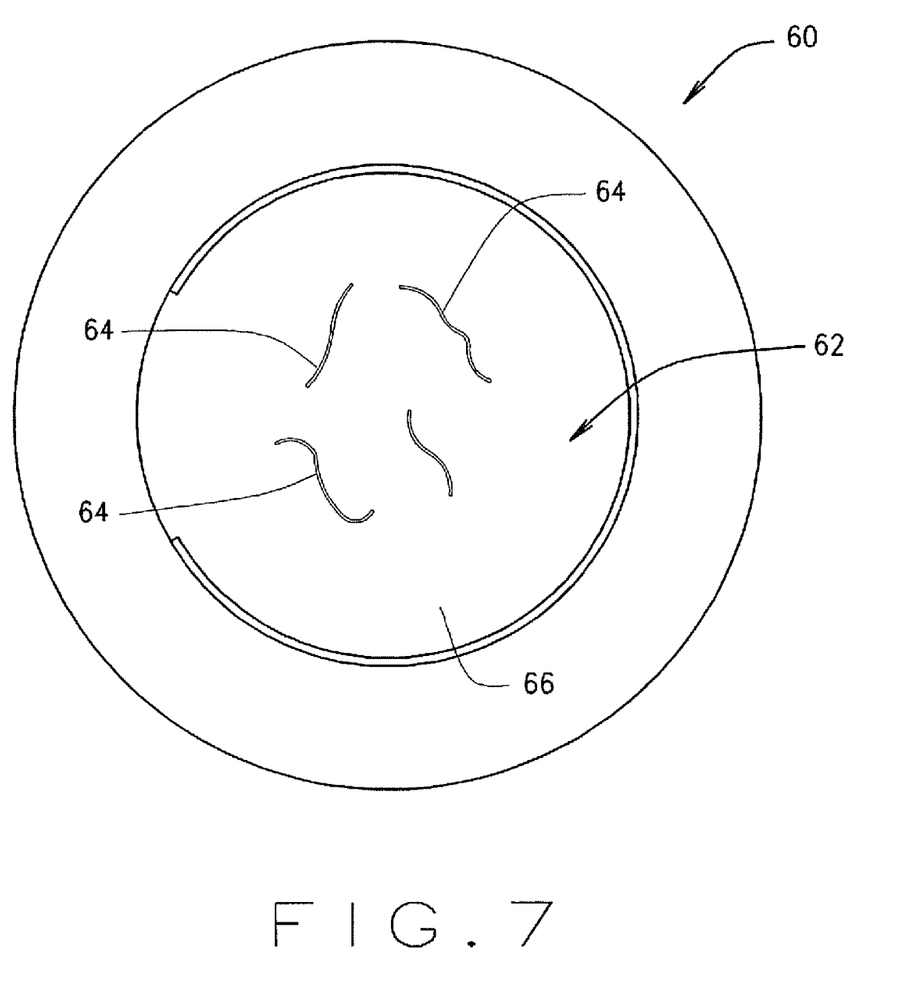
FIG. 7 is a view from the concave side of still another embodiment of an exemplary reverse-acting rupture disc constructed in accordance with the teachings of the present invention wherein the control scores are non-linear and non-concentric.

The formation of the control scores 26 during manufacturing is controlled by suitable equipment to provide a rated reversal load for the disc 10 by weakening the dome 12 at the area around the control scores 26. Collapse or buckling of the dome occurs at or near the rupture pressure. Although the present invention is described in terms of arcuate control scores 26, it will be appreciated that other patterns of control scores 26 may be utilized to provide the rated reversal load as will be hereinafter further discussed, for example, with respect to FIG. 7. Examples 1 and 2, discussed below, illustrate how the number of control scores 26, the length L1, width W1, and depth D1 of the control scores 26, and the radial position P1 of the control scores can be varied to provide various different reversal loads.

The disc 10 may also include a rupture score 28 formed at a radial position P2 adjacent the outer circumference of the dome 12 as illustrated in the exemplary embodiments of FIGS. 1(a) and 2(a). In other embodiments, the rupture score 28 may be formed at a radial position P2 closer to the apex 18 of the dome 12 or may be formed in the flange 24. Upon reversal of the dome 12, there is a higher stress at the rupture score 28 as compared to the control scores 26 so that the disc 10 ruptures at the rupture score 28. Like the control scores 26, the width, depth, length L2, and position P2 of the rupture score 28 can likewise be varied to ensure that the disc 10 will rupture upon reversal at the predetermined pressure. In the exemplary embodiments, the rupture score 28 has a depth that is greater than the depth D1 of any control score 26. Further, in the exemplary embodiment shown in FIG. 1(a), the rupture score 28 likewise has an arcuate length L2 of approximately 300 degrees of the circumference C1 of the dome 12. In an embodiment having at least one control score 26 with an arcuate length L1 of approximately 300 degrees of the circumference C1 of the dome 12, and wherein the at least one control score 26 and the rupture score 28 are concentrically aligned, the midpoint M2 of the rupture score 28 is aligned with the midpoint M1 of the control score 26 along the arc A1 of the dome 12 as shown in FIG. 1(a). In addition, a hinge 30 is formed between the pair of endpoints E1 of the rupture score 28. The hinge 30 is positioned between the dome 12 and the flange 24 so that the dome 12 remains coupled to the flange 24 after rupture of the disc 10. In another embodiment as shown in FIG. 2(a), the midpoint M2 of the rupture score 28 is not aligned with the midpoint M1 of at least one control score 26. Other variations of these parameters are likewise contemplated.

It is also recognized that rupture scores are not the only means available for opening a reverse-acting rupture disc and that other rupture mechanisms are known in the industry to accomplish this task. For example, knife blades and sheering may also be used. Regardless of the rupture mechanism utilized, use of the present control scores 26 will work equally as well with any rupture mechanism.

Figure 3A:
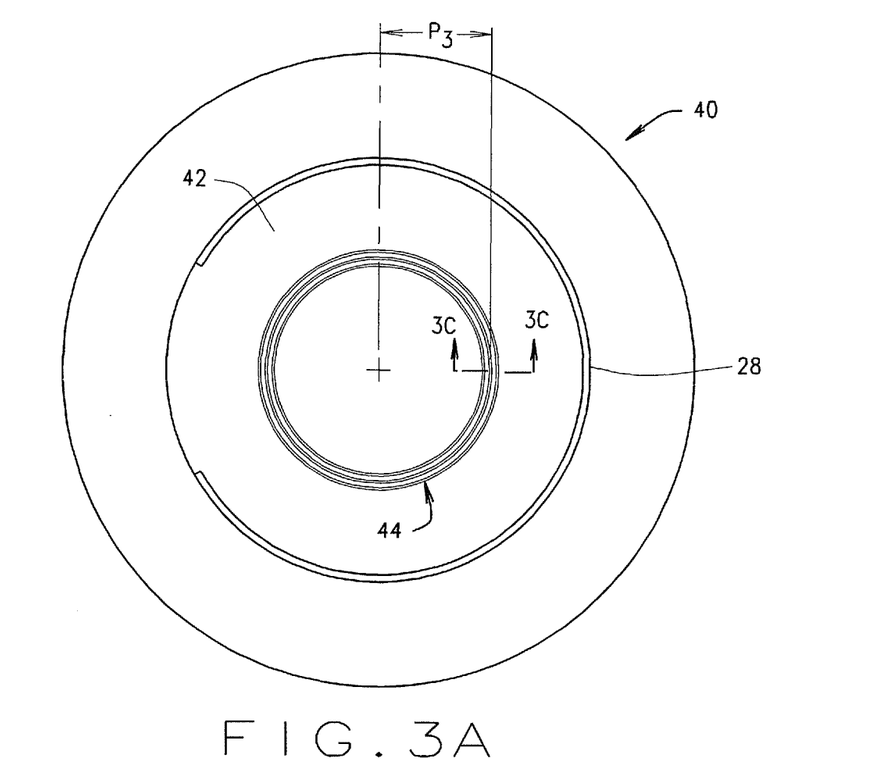
FIG. 3(a) is a view from the concave side of an exemplary reverse-acting rupture disc constructed in accordance with one embodiment of Example 1 of the present invention.
Figure 3B:
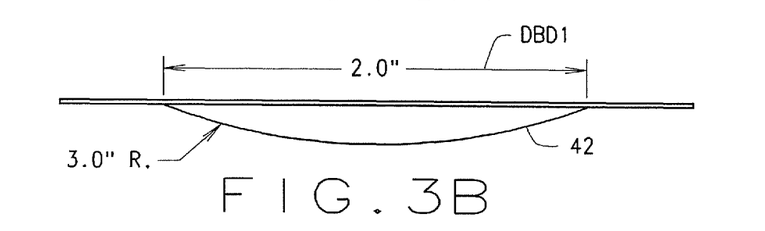
FIG. 3(b) is a side elevational view of the rupture disc shown in FIG. 3(a).
Figure 3C:
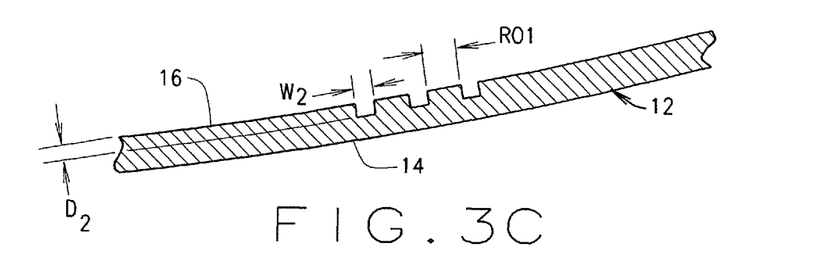
FIG. 3(c) is a cross-sectional view of the control scores located on the concave side of the rupture disc shown in FIGS. 3(a) and 3(b) taken along line 3C-3C in FIG. 3(a).
Figure 4:
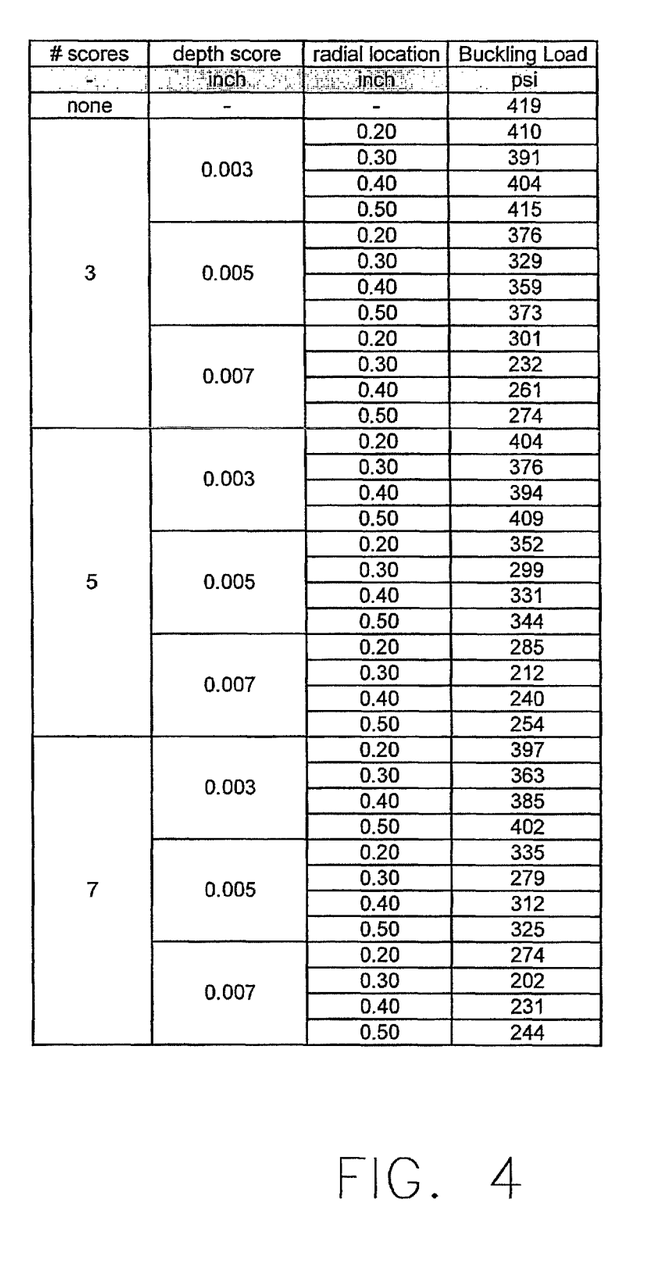
FIG. 4 is a table showing the results of the calculation of buckling load performed on the rupture disc of Example 1.
Figure 5:
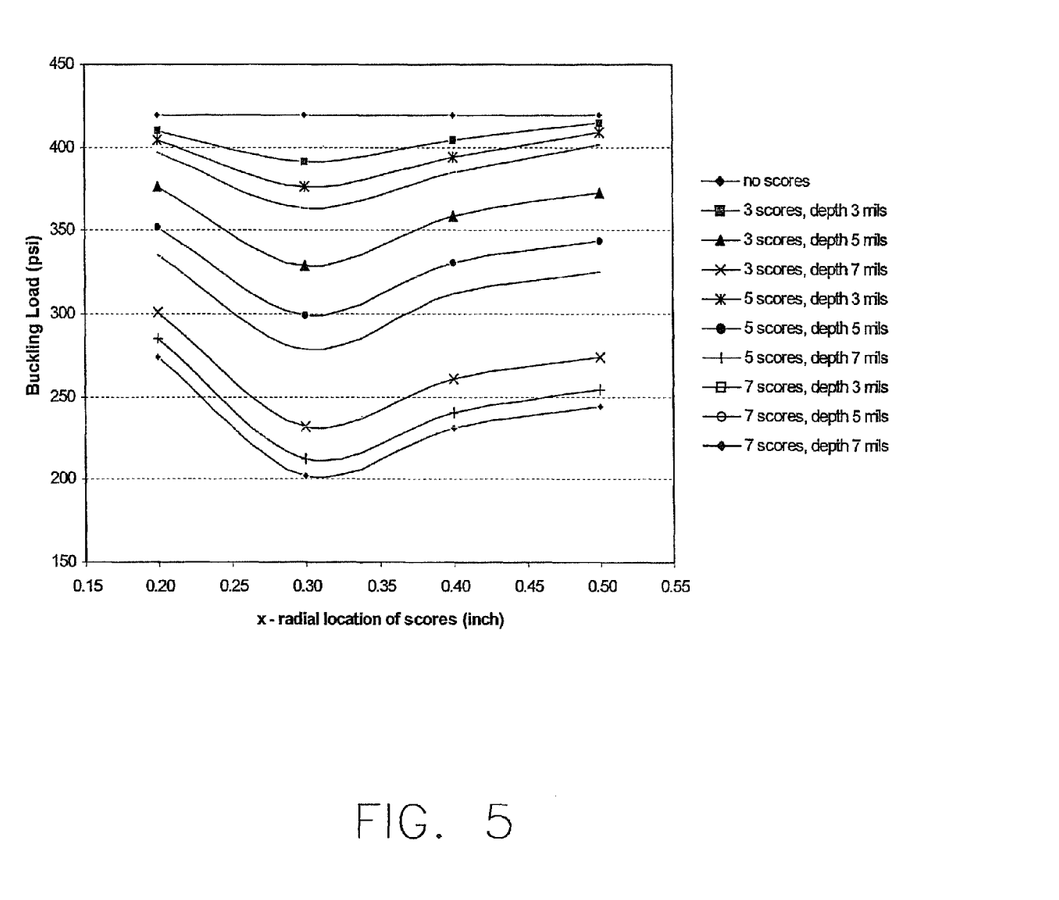
FIG. 5 is a graph showing the results of the calculation of buckling load performed on the rupture disc of Example 1.

Example 1, as illustrated in FIGS. 3-5, is a theoretical example that illustrates how material removed or thinned from a rupture disc dome can modify its buckling load. Example 1 considers a reverse-acting rupture disc 40 made out of 0.010 inch thick coil of 316 Stainless Steel. The buckling load or reversal load of the dome geometry is calculated using the Finite-Element Analysis (FEA) method using commercial software. In the simulations, the dome 42 of disc 40, which represents an arcuate portion of a sphere, is modeled as a spherical dome 42 having a sphere radius RI of three (3) inches and a dome bore diameter DBD1 or cordial length of two (2) inches as shown in FIG. 3(b). In the simulation, the disc 40 thickness of 0.010 inches is uniform across the dome 42. For such a geometry and material, the buckling load with no material removed or thinned from the dome 42 is estimated at 419 psi.

A series of test simulations were performed varying the number, depth D2 and radial location P3 of the control scores 44. In the simulation, the control scores 44 are modeled as concentric full circles with a uniform width W2 of 0.002 inches, and a radial offset RO1 of 0.006 inches between the score circles. Specifically the following combinations were evaluated with the simulation:

1. Number of control scores: 3, 5 and 7 control scores
2. Depth D2 of the control scores: 0.003, 0.005 and 0.007 inches
3. Radial location P3 of the center control score: 0.2, 0.3, 0.4 and 0.5 inches The calculated buckling loads for each of these combinations is shown in FIG. 4 and all the results are plotted together in FIG. 5. The horizontal axis of the plot in FIG. 5 shows the radial position P3 in inches and the vertical axis shows the estimated buckling or reversal load from the simulation in psi. As seen from a review of both FIGS. 4 and 5, the buckling load varies based upon the parameters illustrated in FIG. 4 and range from a low of 202 psi to a high of 419 psi with no control scores. FIG. 5 illustrates the various bands of reversal loads achieved based upon each individual set of parameters used in the simulation.

The results of the simulation tests show that the buckling load of the dome geometry can be effectively adjusted by removing material in the form of control scores 44. These control scores 44 are machined with a system that allows for a very precise variation of the location P3 and depth D2 of each control score. This allows for an almost continuous adjustment of the buckling load at which the reverse-acting rupture disc 40 would start to collapse. As a result, any buckling load or reversed pressure can be achieved based upon a predetermined rupture pressure.

Figure 6A:
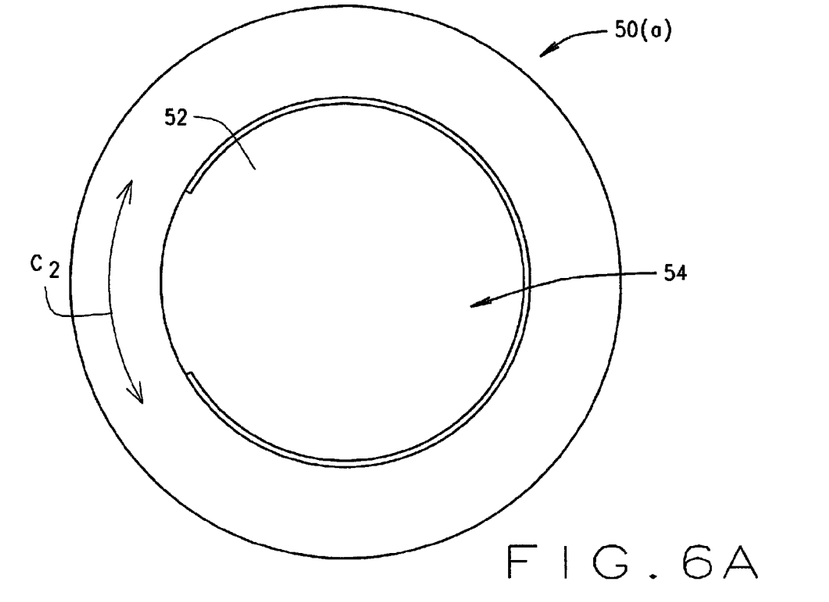
FIG. 6(a) is a view from the concave side of a typical reverse-acting rupture disc that does not have control scores associated therewith.
Figure 6B:
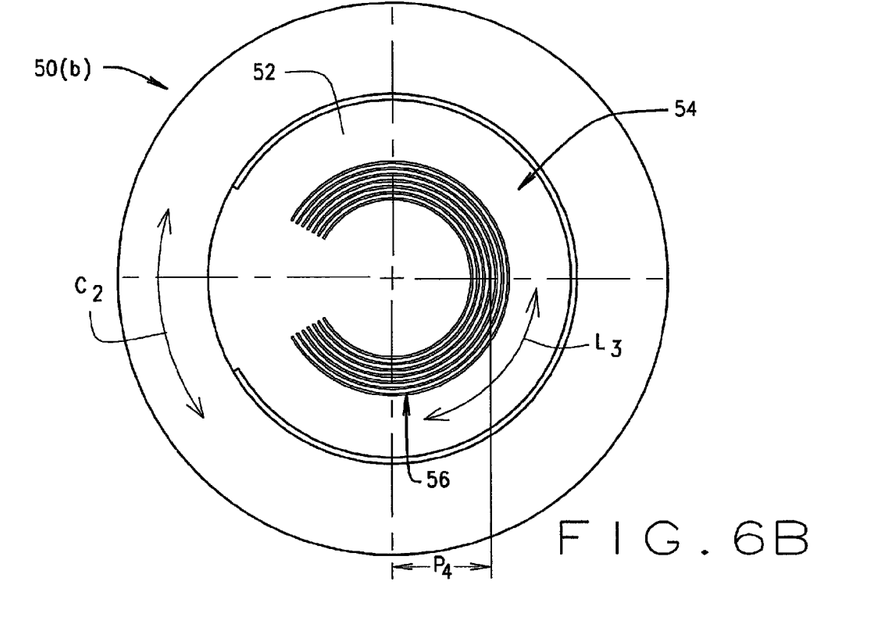
FIG. 6(b) is a view from the concave side of an exemplary reverse-acting rupture disc constructed in accordance with Example 2 of the present invention.

Example 2 includes laboratory tests performed on a disc 50 having a different geometry as illustrated in FIGS. 6(*a*) and 6(*b*) from the disc geometry described in Example 1 (FIGS. 3-5). FIG. 6 shows the concave face 52 of two reverse-acting rupture discs 50(*a*) and 50(*b*) made of 316 Stainless Steel coil. The nominal coil thickness is 0.005 inch. In the disc 50(*a*) illustrated in FIG. 6(*a*), the concave face 52 is a disc dome 54 with no control scores to adjust its buckling load. In the disc 50(*b*) illustrated in FIG. 6(*b*), the concave face 52 was modified by machining seven (7) control scores 56. Specifically, in the disc 50(*b*) illustrated in FIG. 6(*b*), seven (7) control scores 56 were machined as follows: a length L3 of approximately 300 degrees of the circumference C2 of the dome 54, and a 0.0025 inch depth (half the coil nominal thickness) for each control score at a mean radial location P4 of 42.5% of the distance between the apex of the dome 54 and the outer circumference of the dome 54.

The buckling load of the disc 50(*a*) illustrated in FIG. 6(*a*), without control scores, was measured in a laboratory test at 32 psi. The buckling load of the disc 50(*b*) illustrated in FIG. 6(*b*), with seven (7) control scores 56, was measured in a laboratory test at 24 psi. Hence, a 25% reduction of the buckling load was obtained through the aforementioned removal of material in the dome 54 with the configuration of control scores described above.

Referring to FIGS. 1 and 2, the reverse-acting rupture disc 10 is configured to be positioned within a pressure relief system subject to varying pressures. Typically, such a system has a maximum pressure at which the system becomes inoperable and/or the system operation is unsafe. The disc 10 is positioned to provide pressure relief in the system when the system reaches its predetermined maximum pressure. Specifically, as the pressure in the system increases, the disc dome 12 collapses and the disc 10 ruptures at a predetermined rupture pressure to relieve the pressure within the system. The control scores 26 in the dome 12 are provided to control the pressure at which the dome 12 begins to collapse. For example, if the disc 10 is configured to rupture at a pressure of 10 psi, the dome 12 will start to collapse at or about a pressure of 10 psi. Accordingly, the number of control scores 26, and the width W1, depth D1, length L1, and radial position P1 of each control score 26 can be selectively determined and adjusted during manufacturing to provide a dome 12 that collapses at or near the rupture pressure. If no control scores are used, the reversal or collapse of the dome 12 would start at a higher pressure such as at 15 psi. Upon rupture, the disc 10 remains coupled to the flange 24 via the hinge 30, and the fluid within the system is allowed to pass through a vent, or other mechanism, thereby relieving the pressure within the system.

In one embodiment, a method of manufacturing a reverse-acting rupture disc 10 is provided. The method includes providing a disc 10 having a dome 12 and a flange 24 coupled to an outer circumference 20 of the dome 12 and extending circumferentially around the dome 12, wherein the dome 12 includes a concave side 16 and a convex side 14. At least one control score 26 is formed in the concave side 16 of the dome 12 by removing or thinning material from the dome 12. The at least one control score 26 is positioned at a radial position P1 between an apex 18 of the dome 12 and an outer circumference 20 of the dome 12 and at least one of a depth D1, a length L1, and a width W1 of the at least one control score 26 is controlled so that the depth D1, length L1, width W1, and radial position P1 of the at least one control score 26 controls the pressure at which the dome 12 will collapse. The method also includes forming a rupture score 28 adjacent the outer circumference 20 of the dome 12 so that the disc 10 is configured to rupture at the rupture score 28 when the disc 10 is subjected to a predetermined rupture pressure. Further, a hinge 30 is formed between the dome 12 and the flange 24 so that the dome 12 remains connected to the flange 24 via the hinge 30 after rupture. Moreover, in one embodiment, the at least one control score 26 is formed with an arcuate length L1 of approximately 300 degrees of a circumference C1 of the dome 12. In one embodiment, the method includes forming multiple control scores 26, wherein the number and shape of the control scores 26 are variable and selectively adjustable based upon the pressure at which the dome will collapse.

Although the present invention has been described as having concentric control scores, as will be appreciated by one of ordinary skill in the art, the present invention may include control scores that are straight (linear), non-linear and/or non-concentric positioned at various locations about the dome. For example, the control scores may have a radial position that changes along the length of the control scores. In another example, the control scores may criss-cross and/or be a series of non-linear line segments. See, for example, FIG. 7 wherein the disc 60 includes a dome 62 having non-linear and non-concentric control scores 64 associated with the concave side 66 of dome 62, the control scores 64 likewise having selectively determinable lengths, widths and depths. The location and number of control scores 64 are also selectively determinable to achieve the appropriate reversal pressure for a particular application. Other variations are likewise anticipated and recognized.

Figure 8A:
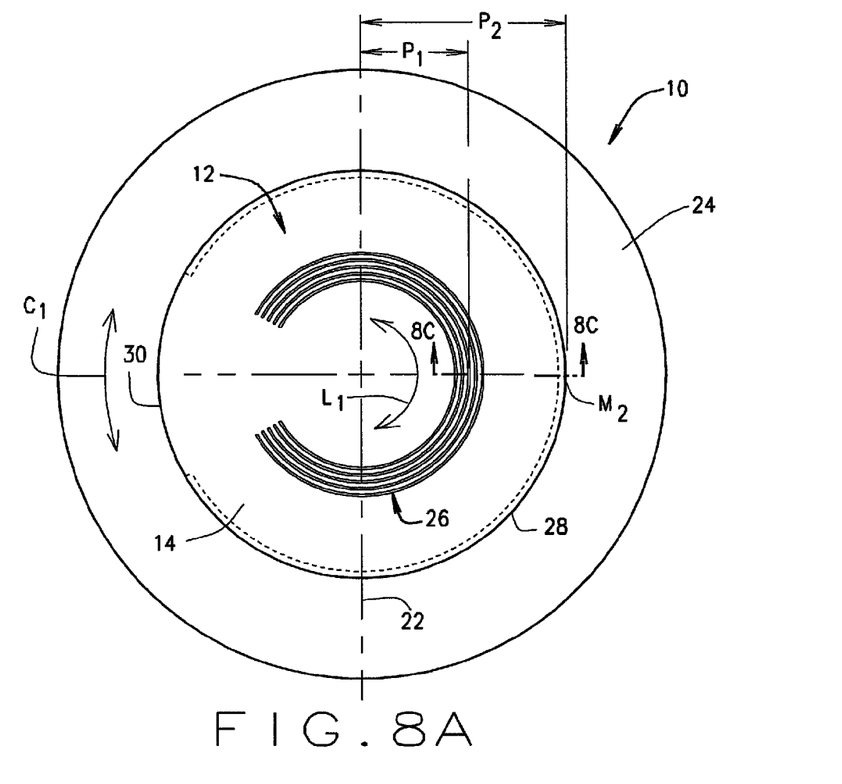
FIG. 8(a) is a view from the convex side of another embodiment of an exemplary reverse-acting rupture disc constructed in accordance with the teachings of the present invention.
Figure 8B:
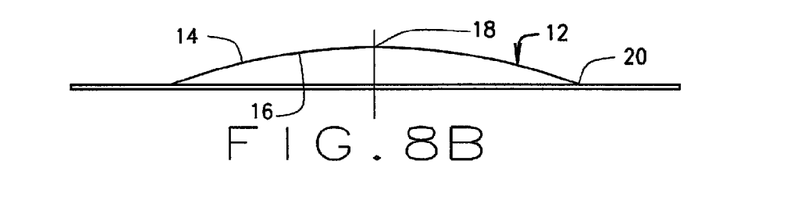
FIG. 8(b) is a side elevational view of the rupture disc shown in FIG. 8(a).
Figure 8C:
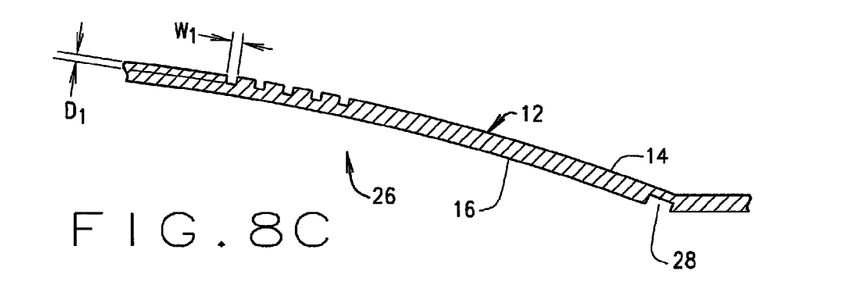
FIG. 8(c) is a cross-sectional view of the control scores located on the convex side of the rupture disc shown in FIGS. 8(a) and 8(b) taken along line 8C-8C in FIG. 8(a).

In certain applications, it is also recognized that the control scores 26, 44, 56 and 64 as illustrated in FIGS. 1-3, 6(*b*) and 7 can likewise be formed on the convex side of the dome of a particular rupture disc. In applications where sanitary conditions are not a factor, control scores formed on the convex side of a particular rupture disc can likewise be utilized to control the reversal pressure of a particular disc. For example, as illustrated in FIGS. 8(*a*), 8(*b*) and 8(*c*), at least one of a plurality of control scores 26 can be formed or otherwise produced on the convex side 14 of the disc dome 12. Like the control scores illustrated in FIG. 1, each of the control scores 26 in FIG. 8 is positioned at a different radial position P1 between the apex 18 and the outer circumference 20 of the dome 12. As with the control scores illustrated in FIGS. 1 and 2, each of the control scores 26 of FIG. 8 have an arcuate length and a midpoint as illustrated. As best illustrated in FIG. 8(*c*), the control scores 26 are formed or otherwise produced on the convex side 14 of the dome 12 whereas the rupture score 28 is formed on the concave side 16 of the dome 12. As discussed above, the depth D1, the length L1, the width W1, and the radial position P1 of the control scores 26 are again controlled during manufacture to provide a rated reversal load or pressure for the disc 10 so as to achieve a predetermined rupture pressure. In addition, similar to the control scores illustrated in FIG. 2, at least one of the plurality of control scores 26 associated with the embodiment illustrated in FIG. 8 can have a different length L1 and/or can be staggered so that the midpoint of at least one control score is not aligned with the midpoint of other control scores. Also, at least one of the plurality of control scores in the embodiment illustrated in FIG. 8 can have a different depth D1 and/or a different width W1 than other control scores as previously discussed and illustrated in FIG. 2. As a result, all of the disclosures set forth above with respect to the various control scores and the ability to selectively adjust and determine the length, width, depth, number and radial location of such control scores are equally applicable whether such control scores are formed on the concave or convex side of the dome of the disc.

As various modifications could be made to the exemplary embodiments described above with reference to the corresponding illustrations without departing from the spirit and scope of the present invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A reverse-acting rupture disc for use with and attached to a storage and/or pressurized system comprising:
   a dome having a convex side, a concave side, and a thickness;
   at least one control score formed in said dome between an apex of said dome and an outer circumference of said dome and having a reduced thickness as compared to the thickness of said dome, said at least one control score having an arcuate length measured along the circumference of said dome, a width, a depth and a radial position between the apex of said dome and an outer circumference of said dome; and
   a rupture score formed in said disc, said disc being configured to rupture at said rupture score after said dome collapses;
   the radial position of said at least one control score being selectively determined to weaken said dome and to reduce a reversal pressure of said dome so as to control the reversal pressure at which said dome will start to collapse, said at least one control score being radially positioned on said dome between the apex and said rupture score.

2. The rupture disc defined in accordance with claim 1 wherein the depth of said at least one control score is selectively determined to control the reversal pressure at which said dome will start to collapse.

3. The rupture disc defined in claim 1 wherein the length of said at least one control score is selectively determined to control the reversal pressure at which said dome will start to collapse.

4. The rupture disc defined in claim 1 wherein the width of said at least one control score is selectively determined to control the reversal pressure at which said dome will start to collapse.

5. The rupture disc defined in claim 1 further including a plurality of control scores, each control score being radially positioned on said dome at a different radial position between the apex and said rupture score, each control score having an arcuate length measured along the circumference of said dome, the number of said control scores being selectively determined to control the reversal pressure at which said dome will start to collapse.

6. A reverse-acting rupture disc for use with and attached to a storage and/or pressurized system comprising:
   a dome having a convex side, a concave side, and a thickness;
   a plurality of control scores formed in said dome between an apex of said dome and an outer circumference of said dome and having a reduced thickness as compared to the thickness of said dome; and
   a rupture score formed in said disc, said disc being configured to rupture at said rupture score after said dome collapses, and each control score being radially positioned on said dome at a different radial position between the apex and said rupture score and each lying in a plane parallel to the outer circumference of said dome;
   the radial position of at least one of said plurality of control scores being selectively determined to weaken said dome and to reduce a reversal pressure of said dome so as to control the reversal pressure at which said dome will start to collapse, and at least one of said plurality of control scores having at least one of a different depth, width, and length as compared to another of said plurality of control scores.

7. The rupture disc defined in claim 5 wherein said plurality of control scores are non-concentrically arranged.

8. The rupture disc defined in claim 1 wherein said at least one control score is formed in the concave side of said dome to preserve a smooth face on the convex side of said dome.

9. The rupture disc defined in claim 1 wherein said at least one control score is formed in the convex side of said dome.

10. The rupture disc defined in claim 1 wherein the length, width and depth of said at least one control score are selectively determined to control the reversal pressure at which said dome will start to collapse.

11. A reverse-acting rupture disc for use with and attached to a storage and/or pressurized system comprising:
    a dome having a convex side, a concave side, and a thickness;
    a plurality of control scores formed in said dome between an apex of said dome and an outer circumference of said dome and having a reduced thickness as compared to the thickness of said dome, at least one of said control scores having at least one of a different length, width, and depth as compared to another of said plurality of control scores; and
    an arcuate rupture score formed in said disc adjacent an outer circumference of said dome, said rupture score lying in a plane that is parallel to at least one of said plurality of control scores, said disc being configured to rupture at said rupture score after said dome collapses;
    the depth of said at least one control score being selectively determined to weaken said dome and to reduce a reversal pressure of said dome so as to control the reversal pressure at which said dome will start to collapse, said at least one control score being positioned on said dome between the apex and said rupture score.

12. The rupture disc defined in claim 11 wherein the width of said at least one control score is selectively determined to control the reversal pressure at which said dome will start to collapse.

13. The rupture disc defined in claim 11 wherein said at least one control score is radially positioned on said dome between an apex of said clothe and an outer circumference of said dome, the radial position of said at least one control score being selectively determined to control the reversal pressure at which said dome will start to collapse.

14. The rupture disc defined in claim 11 wherein the length of said at least one control score is selectively determined to control the reversal pressure at which said dome will start to collapse.

15. The rupture disc defined in claim 11 wherein a number of said control scores being selectively determined to control the reversal pressure at which said dome will start to collapse.

16. The rupture disc defined in claim 11 wherein said at least one control score is formed in the concave side of said dome.

17. A reverse-acting rupture disc for use with and attached to a storage and/or pressurized system comprising:

a dome having a convex side, a concave side, and a thickness;

at least one control score formed in said dome between an apex of said dome and an outer circumference of said dome and having a reduced thickness as compared to the thickness of said dome, said at least one control score having a length, a width, and a depth; and a rupture score formed in said disc, said disc being configured to rupture at said rupture score after said dome collapses, and said at least one control score and said rupture score lying in parallel planes and each including an arcuate length measured along the circumference of said dome;

the length of said at least one control score being selectively determined to weaken said dome and to reduce a reversal pressure of said dome so as to control the reversal pressure at which said dome will start to collapse, said at least one control score being positioned on said dome between the apex and said rupture score.

18. The rupture disc defined in claim 17 wherein the width of said at least one control score is selectively determined to control the reversal pressure at which said dome will start to collapse.

19. The rupture disc defined in claim 17 wherein the depth of said at least one control score is selectively determined to control the reversal pressure at which said dome will start to collapse.

20. The rupture disc defined in claim 17 wherein said at least one control score is radially positioned on said dome between an apex of said dome and an outer circumference of said dome, the radial position of said at least one control score being selectively determined to control the reversal pressure at which said dome will start to collapse.

21. The rupture disc defined in claim 17 further including a plurality of control scores, the number of said control scores being selectively determined to control the reversal pressure at which said dome will start to collapse.

22. The rupture disc defined in claim 21 wherein at least one of said plurality of control scores has at least one of a different depth, width, and length as compared to another of said plurality of control scores.

23. The rupture disc defined in claim 17 wherein said at least one control score is formed in the concave side of said dome.

24. A reverse-acting rupture disc for use with and attached to a storage and/or pressurized system comprising:

a dome having a convex side, a concave side, and a thickness;

a plurality of control scores formed in said dome between an apex of said dome and an outer circumference of said dome and having a reduced thickness as compared to the thickness of said dome, at least one of said control scores having at least one of a different length, width, and depth as compared to another of said plurality of control scores; and an arcuate rupture score formed in said disc and including ends with a hinge therebetween, said disc being configured to rupture at said rupture score after said dome collapses, said rupture score lying in a plane parallel to at least one of said control scores;

the width of said at least one control score being selectively determined to weaken said dome and to reduce a reversal pressure of said dome so as to control the reversal pressure at which said dome will start to collapse, said at least one control score being positioned on said dome between the apex and said rupture score.

25. The rupture disc defined in claim 24 wherein the length of said at least one control score is selectively determined to control the reversal pressure at which said dome will start to collapse.

26. The rupture disc defined in claim 24 wherein said at least one control score is radially positioned on said dome between an apex of said dome and an outer circumference of said dome, the radial position of said at least one control score being selectively determined to control the reversal pressure at which said dome will start to collapse.

27. The rupture disc defined in claim 24 wherein the depth of said at least one control score is selectively determined to control the reversal pressure at which said dome will start to collapse.

28. The rupture disc defined in claim 24 wherein a number of said control scores being selectively determined to control the reversal pressure at which said dome will start to collapse.

29. The rupture disc defined in claim 24 wherein said at least one control score is formed in the concave side of said dome.

30. A method of manufacturing a reverse-acting rupture disc for use with and attached to a storage and/or pressurized system, said method comprising:

providing a disc having a dome including a concave side, a convex side, and a thickness;

forming at least one arcuate control score in the concave side of the dome between an apex of said dome and an outer circumference of said dome having a reduced thickness as compared to the thickness of said dome, said at least one control score having an arcuate length about said apex of said dome, a width, and a depth, said at least one control score lying in a plane parallel to the outer circumference of said dome;

forming a rupture score in said disc, said disc being configured to rupture at the rupture score after said dome collapses; and positioning the at least one control score at a radial position between an apex of the dome and an outer diameter of the dome to weaken said dome and to reduce a reversal pressure of said dome so as to control a reversal pressure at which the dome will start to collapse, said at least one control score being positioned on said dome between the apex and said rupture score.

31. The method defined in claim 30 wherein said method further includes controlling at least one of the depth, the width, and the length of the at least one control score to control the reversal pressure at which the dome will collapse.

32. The method defined in claim 30 wherein said method further includes forming a plurality of control scores in the concave side of the dome, the number of control scores being selectively determined to control the reversal pressure at which the dome will start to collapse.

33. The method defined in claim 32 wherein at least one of said plurality of control scores is formed with at least one of a different depth, width, and length as compared to another of said plurality of control scores.

34. The rupture disc of claim 1, wherein the arcuate length is about 300° of a circumference of said dome.

35. The rupture disc of claim 34, wherein a non-scored portion is located between ends of the arcuate length.

36. The rupture disc of claim 5, wherein midpoints of the arcuate lengths of said plurality of control scores are aligned.

37. The rupture disc of claim 5, wherein midpoints of the arcuate lengths of said plurality of control scores are not aligned.

38. The rupture disc of claim 17, wherein the arcuate length is about 300° of a circumference of said dome.

39. The rupture disc of claim 38, wherein a non-scored portion is located between ends of the arcuate length.

40. The rupture disc of claim 38, wherein the rupture score has an arcuate length of about 300° of a circumference of said dome.

* * * * *